March 29, 1938.  J. F. HYDE  2,112,241

JOINING GLASS BLOCKS

Filed April 22, 1937

RESIN — GLASS BLOCK

FACES OF RESIN AND BLOCK SPRAYED WITH VINYL ACETATE BEFORE RESIN IS COMPRESSED ON BLOCK.

RESINOUS FACES OF GLASS BLOCKS SPRAYED WITH VINYL ACETATE BEFORE JOINING.

INVENTOR.
JAMES FRANKLIN HYDE
BY Dorsey, Cole + Harner
ATTORNEYS.

Patented Mar. 29, 1938

2,112,241

UNITED STATES PATENT OFFICE 2,112,241

JOINING GLASS BLOCKS

James Franklin Hyde, Corning, N. Y., assignor to Corning Glass Works, Corning, N. Y., a corporation of New York Application April 22, 1937, Serial No. 138,478

2 Claims. (Cl. 72—37)

This invention relates to the art of joining or cementing together glass articles and has for its object to form substantially invisible weathertight flexible joints between glass articles, such as glass building units or blocks.

In my prior Patent Number 2,052,229, issued August 25, 1936, I have described a method of joining glass building units which comprises (1) applying resinous facings to the units by compressing heat softened sheets of completely polymerized synthetic resin against opposite faces of the units between accurately spaced platens whereby the units are given very accurate external dimensions, and (2) the resinous faces of the units are coated with a viscous solution of the polymerized resin dissolved in the monomer and the coated facings are pressed together.

I have now discovered that better adherence is obtained between the adjacent resinous facings and also between the resin and the glass if the contacting surfaces are first treated with a polymerizable monomer such as vinyl acetate.

The present invention comprises wetting the contacting surfaces of the glass and the sheets of resin with a monomer such as vinyl acetate before the sheets are compressed with heat against the opposite faces of the unit.

The invention further comprises wetting the external resinous faces of the units with the monomer and bringing them into close contact.

Figure 1:
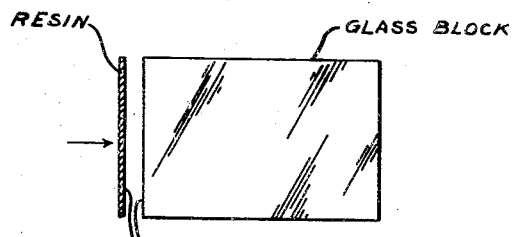
Figure 2:
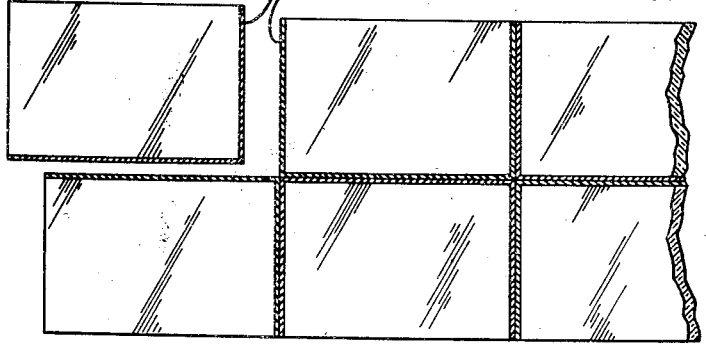

In the drawing Fig. 1 is an elevation of a glass block and a sheet of resin to be attached thereto and Fig. 2 is an elevation of a portion of a wall comprising a plurality of resin faced glass blocks joined together in accordance with my invention.

In practicing my invention the glass surfaces are first cleaned and wiped off with vinyl acetate. The sheets of resin are sprayed with vinyl acetate and are then applied to the treated faces of the unit. The sheets of resin are heated to 80°–100° C. and compressed preferably by means of heated accurately spaced platens as described in my prior patent, whereupon the resin becomes an integral part of the glass unit. Before removing the pressure the resin is chilled, as disclosed in my prior patent above referred to, and accurate dimensions of the completed unit are thus maintained.

In joining the units so prepared, the resin coated faces thereof are sprayed with vinyl acetate and brought into close contact, whereupon, after the lapse of several hours, the units will have become welded together with substantially invisible elastic joints or seams which are so strong that applied tension will break the glass before the joints give way.

The following table shows the tension required to cause failure in joints prepared according to my improved method and those prepared by the prior art method with various modifications:

| Test No. | Procedure | Lbs. per sq. in. | Remarks |
|---|---|---|---|
| 1 | New method, joint 24 hrs. old | 75 | Resin still soft. |
| 2 | New method, joint 48 hrs. old | 126 | Glass broke. |
| 3 | New method, joint 72 hrs. old | 160 | Do. |
| 4 | New method, joint 1 month old | 157 | Do. |
| 5 | Old method, fairly clean surfaces | 96 | Joint failed. |
| 6 | Old method, vinyl resin 2 years old and dirty. | 26 | Do. |
| 7 | Old method, glass cleaned with toluene. | 3.5 | Do. |
| 8 | Old method, glass first coated with dilute solution of polymerized resin in vinyl acetate. | 68 | Do. |

I claim:

1. The method of joining glass construction units, which includes washing at least two opposite faces of each unit with a polymerizable monomer of a synthetic resin, moistening the surface of sheets of completely polymerized resin with the monomer, applying the moist surfaces of the sheets to the washed opposite faces of each unit, softening the sheets with heat, compressing the softened sheets against the faces of the unit to predetermined external dimensions and chilling the resin while under pressure.

2. The method of joining glass construction units, which includes washing at least two opposite faces of each unit with a polymerizable monomer of a synthetic resin, moistening the surface of sheets of completely polymerized resin with the monomer, applying the moist surfaces of the sheets to the washed opposite faces of each unit, softening the sheets with heat, compressing the softened sheets against the faces of the unit to predetermined external dimensions, chilling the resin while under pressure, moistening the external faces of the resinous faced units with the monomer and moving the moistened faces into a close abutting relation.

JAMES FRANKLIN HYDE.